M. J. CARROLL.
LAVATORY.
APPLICATION FILED MAY 12, 1917.

1,248,076.

Patented Nov. 27, 1917.

WITNESSES

INVENTOR
Michael J. Carroll
BY
ATTORNEYS

UNITED STATES PATENT OFFICE.

MICHAEL J. CARROLL, OF ELIZABETH, NEW JERSEY.

LAVATORY.

1,248,076.  Specification of Letters Patent.  Patented Nov. 27, 1917.

Application filed May 12, 1917. Serial No. 168,116.

*To all whom it may concern:*

Be it known that I, MICHAEL J. CARROLL, a citizen of the United States, and a resident of Elizabeth, in the county of Union and State of New Jersey, have invented a new and Improved Lavatory, of which the following is a full, clear, and exact description.

The object of the invention is to provide a new and improved lavatory arranged to deliver the water to the bowl without danger of splashing the water about. Another object is to render the plumbing connections exceedingly simple and to allow manufacturing of the lavatory at a comparatively low cost.

In order to produce the desired result use is made of a bowl having a rim and a passage formed in the rim and having an inlet opening connected with a water supply, the passage having an outlet channel opening onto the inner face of the bowl.

A practical embodiment of the invention is represented in the accompanying drawings forming a part of this specification, in which similar characters of reference indicate corresponding parts in both views.

Figure 1:
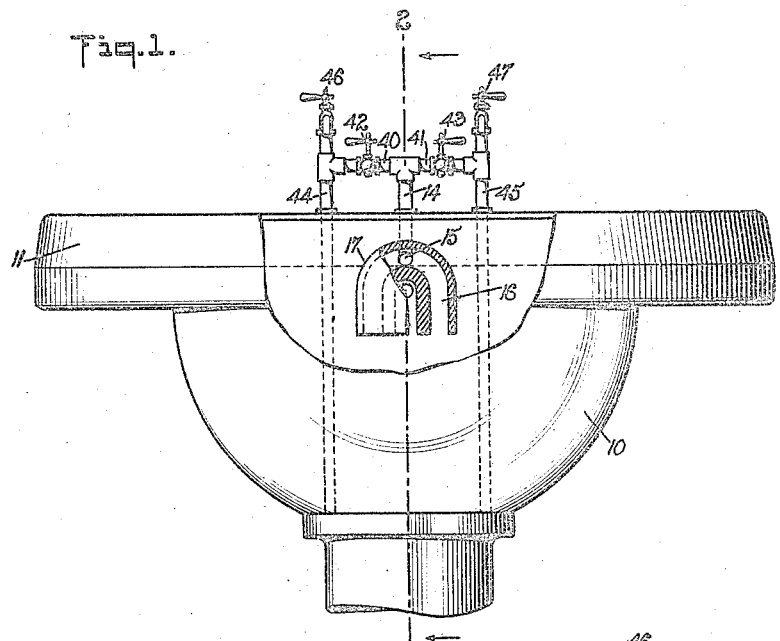
Figure 2:
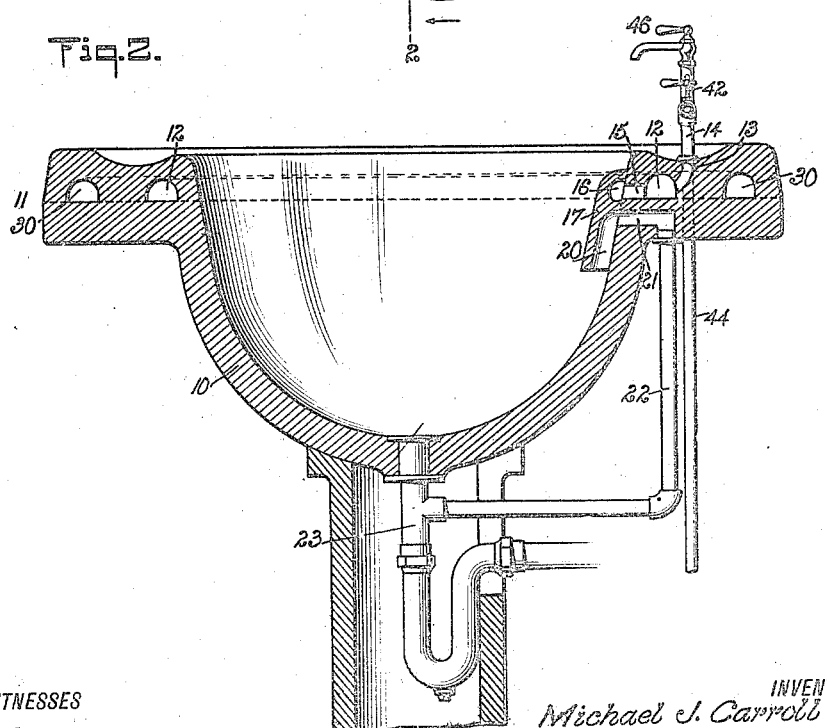

Figure 1 is a front elevation of the lavatory with part of the bowl broken out and part of the delivery member shown in section; and Fig. 2 is a transverse section of the same on the line 2—2 of Fig. 1.

The bowl 10 of porcelain, earthenware or other suitable vitreous material, or of metal, is provided with an integral rim 11 in which is formed an annular passage 12 provided with an upwardly extending inlet opening 13, preferably located at the rear of the lavatory. The inlet opening 13 is engaged by the water supply pipe 14 for delivering hot or cold water, or a mixture of the two, to the annular passage 12. The passage 12 is connected by a transverse port 15 with a delivery channel 16 formed on the inner face of a delivery member 17 integral with the inner face of the bowl 10. The delivery channel 16 is made bifurcated or of inverted U-shape, as plainly indicated in Fig. 1, with the bend at the top and with the port 15 opening into the top so that the water from the passage 12 can pass by way of the port 15 into the delivery channel 16. The legs of the channel 16 extend downwardly and the channel 16 opens in a downward direction onto the inner face of the bowl 10 so that the water is prevented from splashing and a noiseless filling of the bowl takes place.

The delivery member 17 is provided with an overflow channel 20 extending between the legs of the channel 16 and connecting at its lower end with the interior of the bowl and opening at its upper end into a transverse overflow opening 21 formed in the bowl and leading to the bottom of the rim, as plainly shown in Fig. 2. The outer end of the opening 21 is connected with an overflow pipe 22 connected with the waste pipe 23 attached to the bottom of the bowl 10 to carry off the water in the usual manner.

In the manufacture of a lavatory of vitreous material, the upper portion of the bowl 10 and the rim 11 are made in two sections while the material is in a plastic state, of which the upper section is provided with the passage 12, the inlet opening 13 and the port 15, and the upper section is also provided with an annular channel 30 located near the edge of the rim to serve as a vent to prevent cracking of the article during the subsequent burning of the lavatory in the usual kiln. The lower section is provided with the channel 21. The sections are then stuck together, the delivery member 17 which is separately fashioned is likewise stuck in position on the inner face of the bowl, and then the lavatory is burned so as to make the sections and the member 17 integral parts of the lavatory.

It will be noticed that the inlet opening 13 may be made at any point of the rim, that is, at the rear, front or side, and the port 15, the channel 21 and the delivery member 17 may likewise be located at any desired point of the lavatory, as it is evident the circular shape of the passage 12 permits the location of the inlet opening 13 and the port 15 at any point along the channel. As shown in the drawings, the water supply pipe 14 is connected by hot and cold water branch pipes 40 and 41 having valves 42, 43 and coupled to hot and cold water supply pipes 44 and 45. The supply pipes 44 and 45 may be provided at the top with passages 46 and 47 discharging into the bowl 10.

Having thus described my invention, I claim as new and desire to secure by Letters Patent:—

1. A lavatory comprising a bowl having a lateral inlet near the top thereof and a lateral overflow outlet immediately below the inlet, and an inverted U-shaped delivery channel disposed in a plane parallel with a side of the bowl, and having its upper portion in communication at a middle point with the said inlet, and having its legs extending downwardly on opposite sides of the overflow outlet to provide an overflow channel which is closed at its outer side, the lower ends of the overflow channel and the legs of the delivery channel being in substantially the same horizontal plane.

2. A lavatory, comprising a bowl having an upper lateral inlet, and a lower lateral outlet in vertical relation, and a protuberant member on the inner face of the bowl extending over the said inlet and outlet and having a vertical overflow channel formed therein in communication at its upper end with the outlet, and containing an inverted U-shaped delivery channel straddling the outlet and overflow and in communication at its upper end with the said inlet, the legs of the delivery channel extending along opposite sides of the overflow channel and in the plane thereof.

3. A lavatory, comprising a bowl provided in its rim with an annular passage adapted to make connection with a source of water supply, and having a projection on its inner face in which is formed a bifurcate inlet channel in communication at its top with the said annular passage, and having the legs of said inlet channel extending downwardly and inclosing an outlet channel which is in communication at its top with an overflow opening disposed below the said annular passage.

MICHAEL J. CARROLL.

Witness:
SAMUEL R. OGDEN.

Copies of this patent may be obtained for five cents each, by addressing the "Commissioner of Patents, Washington, D. C."